United States Patent [19]

Nagoya

[11] Patent Number: 5,450,095
[45] Date of Patent: Sep. 12, 1995

[54] FRACTION DISPLAY APPARATUS CAPABLE OF DISPLAYING FRACTIONS IN NORMAL FORM

[75] Inventor: Takehiro Nagoya, Mitaka, Japan

[73] Assignee: Casio Computer Co., Ltd., Tokyo, Japan

[21] Appl. No.: 127,949

[22] Filed: Sep. 27, 1993

[30] Foreign Application Priority Data

Sep. 30, 1992 [JP] Japan .................... 4-068168 U
Sep. 30, 1992 [JP] Japan .................... 4-261463

[51] Int. Cl.⁶ .................................................. G09G 3/04
[52] U.S. Cl. ........................................ 345/33; 345/50
[58] Field of Search ............... 345/30, 33, 34, 50, 345/46, 41; 364/706, 708.1, 709.7

[56] References Cited

U.S. PATENT DOCUMENTS

| | | | |
|---|---|---|---|
| 4,918,428 | 4/1990 | Bebel | 345/50 |
| 4,954,977 | 9/1990 | Colombat | 364/709.7 |
| 5,025,403 | 6/1991 | Stephens | 364/709.7 |

FOREIGN PATENT DOCUMENTS

| | | | |
|---|---|---|---|
| 0332335 | 9/1989 | European Pat. Off. | 345/33 |
| 126218 | 11/1978 | Japan | 345/50 |
| 53126218 | 11/1978 | Japan | 345/50 |

*Primary Examiner*—Tommy P. Chin
*Assistant Examiner*—Doon Chow
*Attorney, Agent, or Firm*—Frishauf, Holtz, Goodman, Langer & Chick

[57] ABSTRACT

A display apparatus used in an electronic calculator with a fraction calculating function is constructed by arranging 8-shaped display members made of 7 segments at upper, intermediate and lower stages, while commonly using some of these display segments. A numerator of a fraction is displayed on the upper-staged display member, a denominator of this fraction is displayed on the lower-staged display member, and a bar thereof is displayed utilizing the intermediate display member, so that the fraction may be displayed in the normal mathematic expression form.

2 Claims, 7 Drawing Sheets

| | A | B | C | D | E | F | G |
|---|---|---|---|---|---|---|---|
| Y24 | ○ | ⊠ | ○ | ○ | ○ | ○ | ⊠ |
| Y26 | ⊠ | ⊠ | ⊠ | ⊠ | ⊠ | ○ | ⊠ |
| Y27 | ○ | ○ | ○ | ○ | ○ | ○ | ○ |
| Y28 | ○ | ⊠ | ○ | ⊠ | ⊠ | ⊠ | ○ |

1/2/3

○ --- SELECTED
⊠ --- NOT SELECTED

FRACTION DISPLAY APPARATUS CAPABLE OF DISPLAYING FRACTIONS IN NORMAL FORM

BACKGROUND OF THE INVENTION

1. Field of the Invention

The present invention relates to a display apparatus used in a compact calculator or the like with a fraction calculating function.

2. Description of Prior Art

Conventionally, electronic calculators capable of performing fraction calculation have been widely available in the market.

Figure 8:
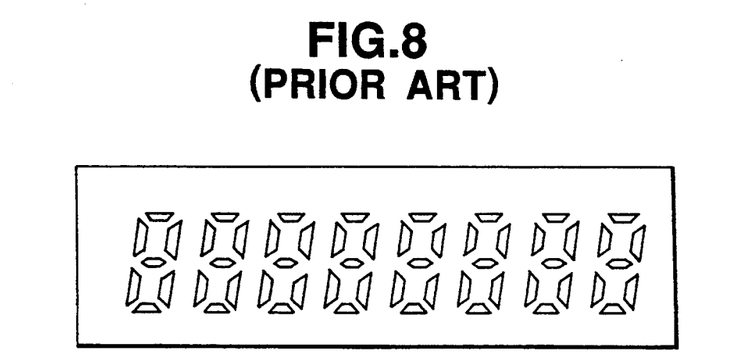
FIG. 8 schematically represents the structure of the conventional display apparatus.

FIG. 8 shows a typical display unit of the conventional calculator having the fraction calculating function. As represented in FIG. 8, a plurality of 8-shaped display elements constructed of 7 segments per 1 digit are arranged along the horizontal (line) direction.

In such a conventional display unit, since numerals are displayed along this line direction, a fraction is displayed in a specific form different from the normal fraction display form.

Figure 9:
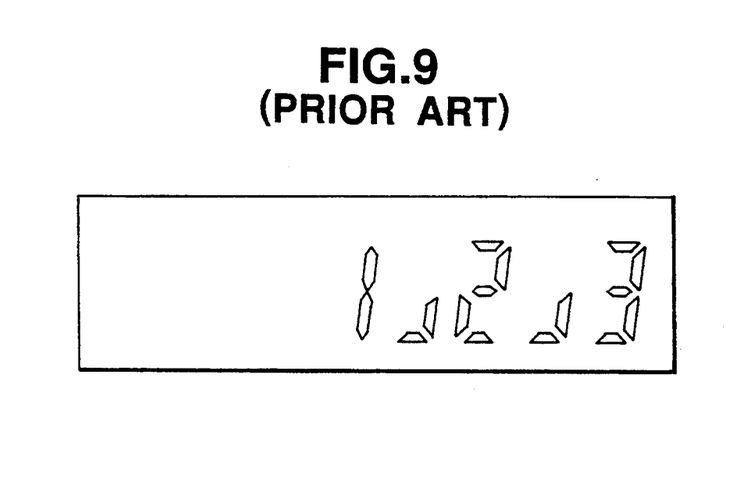
FIG. 9 schematically indicates the fraction display condition by the conventional display apparatus of FIG. 8.

FIG. 9 represents a display state of a mixed fraction (e.g., $1\frac{2}{3}$, namely one and two-third) displayed by the conventional display apparatus. In this case, the mixed fraction of one and two-third is displayed in such a specific display form that the respective numerical characters are arranged among reverse-L-shaped fraction symbols in the order of an integer, a numerator, and a denominator from the upper digit to the lower digit.

However, these conventional fraction display apparatus own the various problems. That is, a fraction formula is displayed in such a manner that the fraction symbols are arranged among the integer, numerator, and denominator of this fraction formula. Such a specific fraction display form is completely different from the normal, or General mathmatical expression form. As a result, any users who do not master such a specific fraction display form may be confused by this fraction display. Furthermore, a total number of display digit occupied by this fraction formula becomes large, as compared with the normal formula such as an integer. In the worst case, a fraction formula with a large numeral value (namely, large digit) cannot be displayed on the display apparatus, i.e., over flow.

On the other hand, the conventional compact electric calculators having the fraction entry function are equipped with the fraction enter key, for instance, "a.b/c". Then, a fraction formula is entered by operating a combination with the number entry key and the fraction entry key.

For example, when a mixed fraction of "a.b/c" is entered by the conventional compact electric calculator with the fraction entry function, the key operation is carried out in such a way that the numeric value indicative of the integer "a" is first entered, the fraction entry key "a.b/c" is manipulated, the numeric value representative of the numerator "b", and subsequently, the fraction entry key "a.b/c" is manipulated, and finally, the numeral value of the denominator "C" is entered.

However, the Japanese typical reading way of the mixed fraction "$2\frac{3}{4}$" is "two and fourth-three". In other words, this mixed fraction is read in the order of the integer "2", the denominator "4", and the numerator "3". As a consequence, there is a difference in the fraction entry key operation order for the conventional calculator with respect to the reading way of this mixed fraction, which may induce misoperation of the fraction formula entry.

SUMMARY OF THE INVENTION

An object of the present invention is to provide a display apparatus capable of displaying a fraction in a normal display form.

Another object of the present invention to provide a display apparatus capable of accepting a number entry order of fraction data corresponding to the Japanese fraction reading order.

To achieve the above-described object, a display apparatus, according to one aspect of the present invention, is characterized by comprising:

a plurality of paired 8-shaped display members, each 8-shaped display member being composed of 7 segments, one of said paired 8-shaped display members disposed at an upper row and the other one disposed at a lower row;

horizontal bar display members each including a segment disposed between said 8-shaped display members disposed at the upper and lower rows;

first auxiliary display members each including two segments extending from both ends of said horizontal bar display member towards said 8-shaped display member disposed at the upper row;

second auxiliary display members each including two segments extending from both ends of said horizontal bar display member towards said 8-shaped display member disposed at the lower row;

driving means, electrically connected to said paired 8-shaped display members, said horizontal display members, said first auxiliary display members and said second auxiliary display members, for driving the segments to display data; and controlling means for controlling said driving means to drive appropriate segments so as to display numerical data including fraction data.

Further, to achieve the objects, an electronic apparatus, according to another aspect of the present invention, is characterized by comprising:

input means for inputting fraction data in such an order of an integer, a denominator, and a numerator;

designation means for designating separations among the integer, denominator and numerator of the fraction data; and display means for displaying the fraction data entered by the input means in a mathematical fraction display form in response to the designation made by the designation means.

BRIEF DESCRIPTION OF THE DRAWINGS

The present invention may be understood by reading the detailed description in conjunction with the accompanying drawings, in which.

DETAILED DESCRIPTION OF THE PREFERRED EMBODIMENTS

OVERALL STRUCTURE OF ELECTRONIC CALCULATOR WITH DISPLAY UNIT

Figure 1:
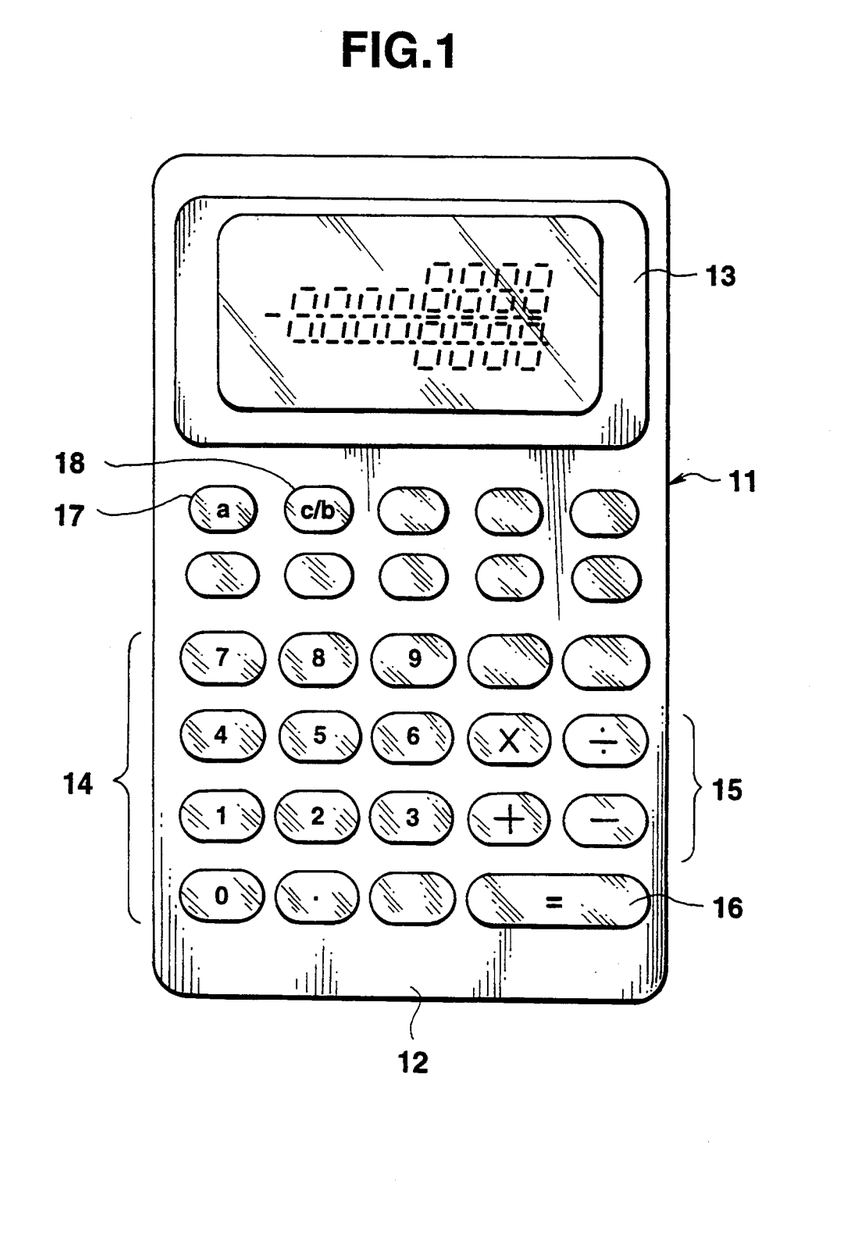
FIG. 1 shows an outer view of a compact electronic calculator equipped with a display apparatus according to an embodiment of the present invention.

FIG. 1 is an outer view of a compact electronic calculator equipped with a display unit according to a currently preferred embodiment of the present invention.

As shown in FIG. 1, a key input (entry) unit 12 and a liquid crystal display (LCD) unit 13 are provided at an upper surface of a calculator main body 11. This key entry unit 12 is equipped with number entry keys 14 for entering numbers of "0" to "9", calculation keys 15 for "+", "−", "X" and " ", and an equal key 16 for executing a calculation. Moreover, an "a" key 17 manipulated when an integer portion of a fraction formula is entered, and a "c/b" key 18 manipulated when "a numerator/a denominator" is entered are provided with this key entry unit 12.

Figure 3A:
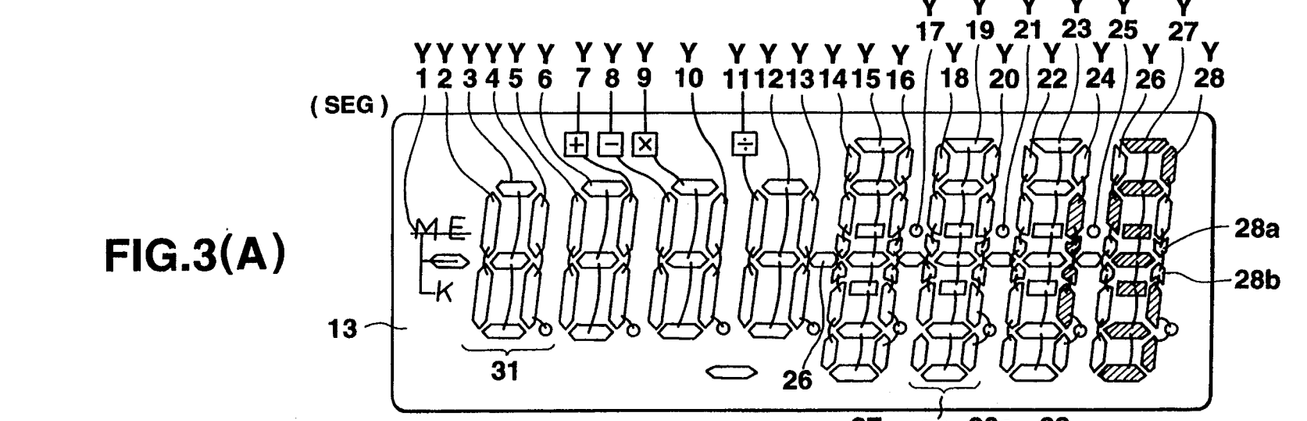
FIGS. 3A and 3B illustrate a segment arrangement/electrode connection condition of the display unit employed in the compact electronic calculator of FIG. 1.
Figure 3B:
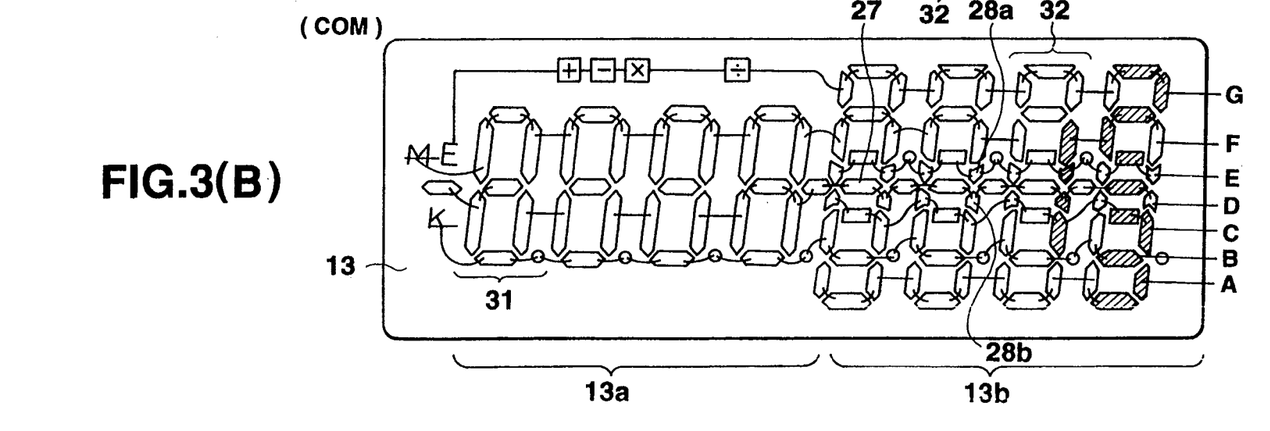

The LCD display unit 13 is represented more in detail in FIGS. 3A and 3B.

CIRCUIT ARRANGEMENT OF CALCULATOR

Figure 2:
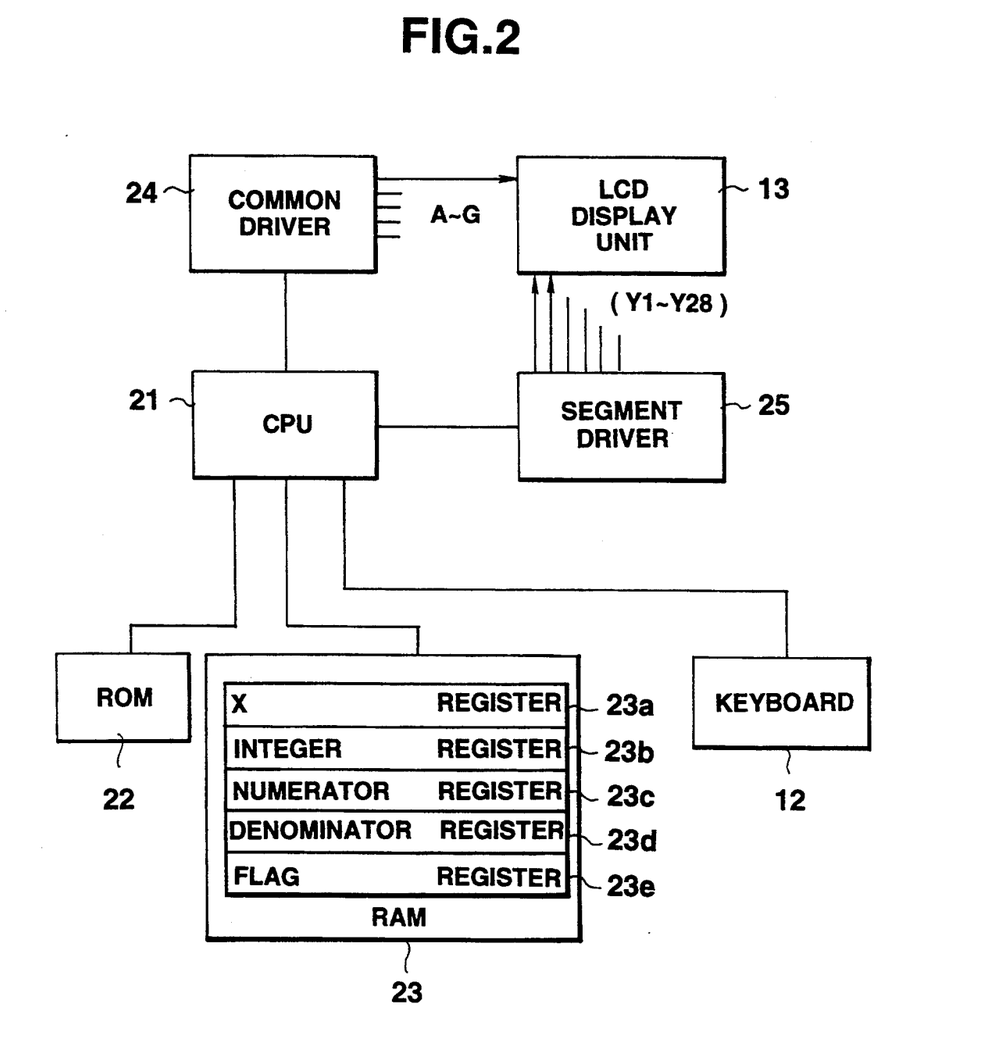
FIG. 2 is a schematic block diagram for representing an overall circuit arrangement of the compact electronic calculator shown in FIG. 1.

FIG. 2 is a schematic block diagram for representing a circuit arrangement of the above-described compact electronic calculator. This compact electronic calculator includes a central processing unit (CPU) 21.

The CPU 21 controls various circuit portions of this compact electronic calculator in response to a key operation signal issued from the key input unit 12. To this CPU 21, a ROM 22 and a RAM 23 are connected in addition to the above-described key entry unit 12. Also, the LCD (Liquid Crystal Display) display unit 13 is connected via a scanning signal (common signal) generator 24 and a data signal (segment signal) generator 25 to this CPU 21.

The ROM 22 stores a calculation control program and a display control program in connection with the various key operation signals derived from the key entry unit 12.

The RAM 23 includes various registers for storing variable data entered by the key input unit 12 and calculation value data processed by the CPU 21. In accordance with the presently preferred embodiment, this RAM 23 further includes an X register 23a, an integer register 23b, a numerator register 23c, a denominator register 23d, and a flag register 23e in order to perform a fraction calculation.

The scanning signal generator (common driver) 24 generates 7 common (scanning) signals A to G. These seven common signals A to G are supplied to scanning (common) electrodes A to G in the LCD display unit 13.

The data signal generator 25 generates 28 data (SEG) signals Y1 to Y28 based on display data furnished from the CPU 21. These 28 data signals are supplied to data electrodes Y1 to Y28 in the LCD display unit 13.

SEGMENT ARRANGEMENT/ELECTRODE CONNECTION

FIGS. 3A and 3B illustrate a segment arrangement and an electrode connection condition of the LCD display unit 13 of the compact electronic calculator according to the currently preferred embodiment of the present invention. FIG. 3A represents a connection condition of the segment electrodes Y1 to Y28 at the data input side, whereas FIG. 3B shows a connection condition of the scanning (common) electrodes A to G.

The construction of the numeral value display unit of the display unit 13 is mainly separated into a one-staged display unit 13a and a two-staged display unit 13b.

The one-staged display unit 13a includes 4 pieces of 8-shaped display members 31. The two-staged display unit 13b includes 4 pieces of 8-shaped display members 32 for each stage. Furthermore, bar segments 26 and 27 are arranged between the upper and lower stages. The auxiliary segments 28a and 28b are arranged at both ends of the bar segment 27 in such a manner that these auxiliary segments connect the vertical segments of the upper/lower 8-shaped display members. As a result, another 8-shaped segment may be constructed of the bar segment 27, the auxiliary segments 28a, 28b, the lower bar of the upper-staged 8-shaped segment, and the upper bar of the lower-staged 8-shaped sediment.

Then, as shown in FIG. 3A, these segments are connected with segment signal lines, and also with common signal lines (see FIG. 3B).

It should be noted that numerator data and denominator data of fraction data are displayed on the upper-staged display member and the lower-staged display member, respectively. An integer is displayed by utilizing the bar segment 27, the auxiliary segments 28a, 28b, and a portion of the upper/lower display members.

DATA ENTRY OF MIXED FRACTION DATA

Referring now to a flow chart of FIG. 4, a method for entering mixed fraction data of "1⅔ (one and two-third)" will now be described. In this case, this mixed fraction data is entered in the order of the integer portion "1", the denominator "3", and the numerator "2" in accordance with the Japanese mathematical reading way.

Figure 4:
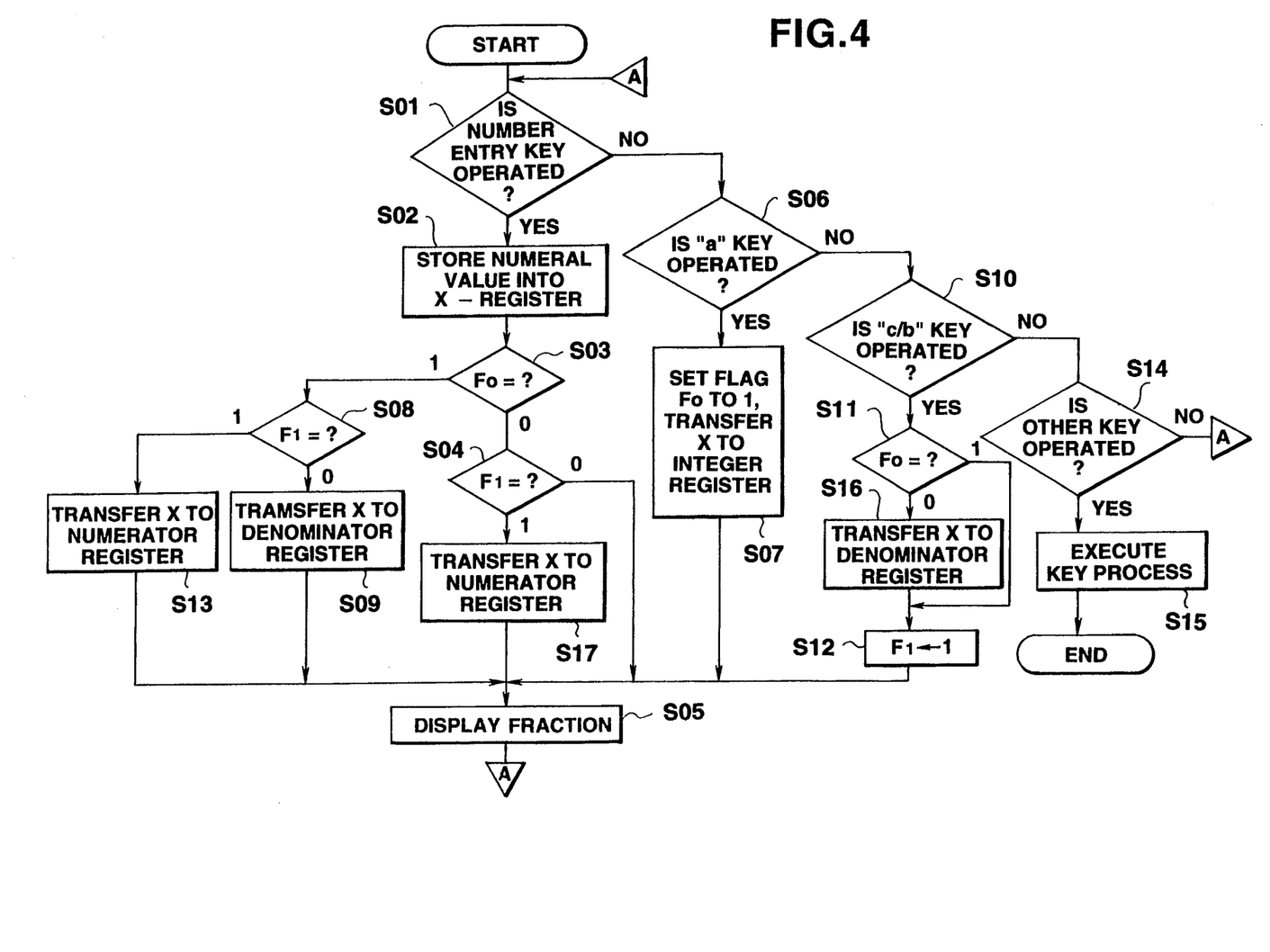
FIG. 4 is a flow chart for explaining entry of fraction data according to the embodiment of the present invention.
Figure 5A:
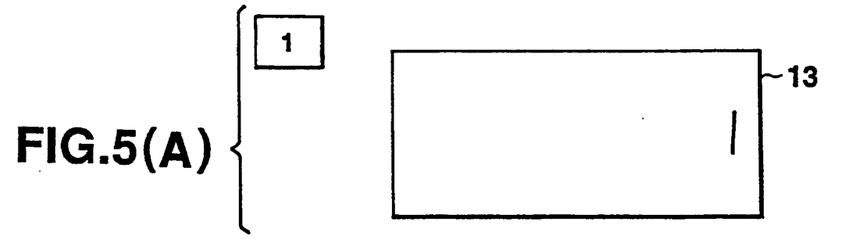
FIGS. 5A to 5E illustratively explain sequential display conditions of the fraction, data in the display unit of the compact electronic calculator shown in FIG. 1.

In the mixed fraction data entry chart of FIG. 4, when "1" is entered by manipulating the number entry key 14 (see FIG. 1), "1" is stored in the X register 23a of the RAM 23 (see FIG. 2) (steps S01 and S02). Then, under the initial condition, since the flags F0 and F1 are 0, the content of the X register 23a is displayed on the display unit 13 as shown in FIG. 5A (steps S03 to S05).

Figure 5B:
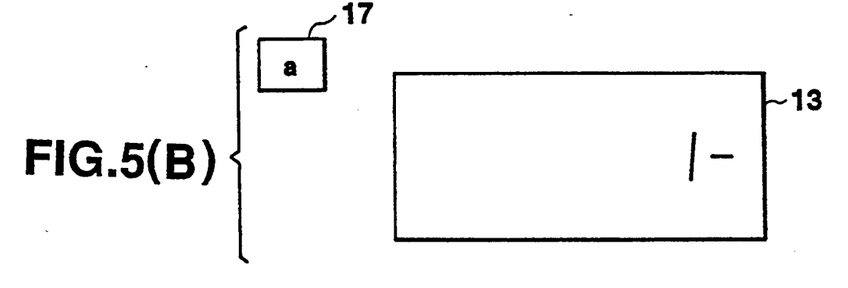

Next, when the "a" key 17 of FIG. 1 is manipulated, the flag F0 is set to 1 and the content of the X register 23a is transferred to the integer register 23b (steps S06 and S07). In the display unit 13, as shown in FIG. 5B, "1" is displayed on the second digit and a "bar" indicative of the fraction is displayed on the first digit (step S05).

Figure 5C:
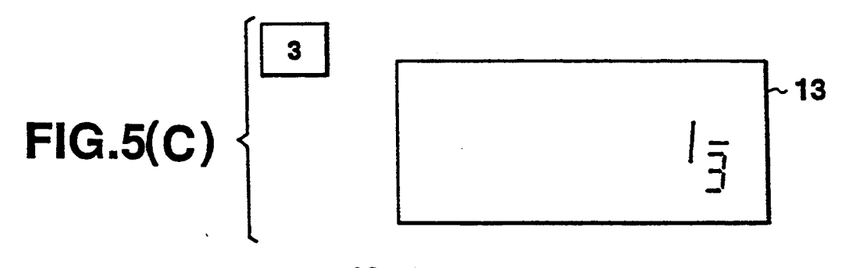

Subsequently, when "3" corresponding to the denominator of the mixed fraction data is entered, 3 is stored in the X register 23a (steps S01 and S02). At this time, since the flag F0 is equal to 1 and the flag F1 is equal to 0, the content of the X register 23a is transferred to the denominator register 23d (steps S03, S08 and S09). Then, this display state is shown in FIG. 5C.

Then, when the "c/b" key 18 is operated, since the flag F0 is equal to 1, the remaining flag F1 is set to 1 (steps S10, S11 and S12).

Figure 5D:
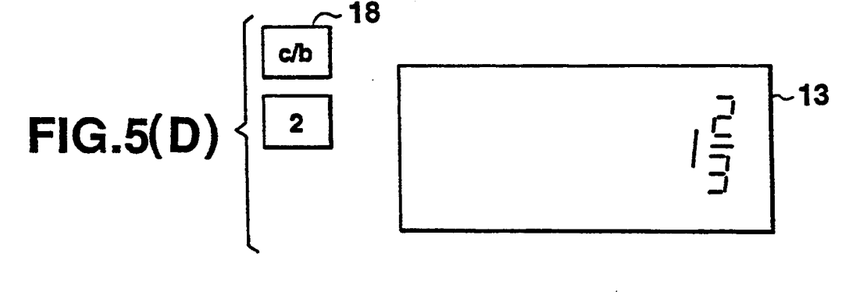

Then, when the value of the numerator "2" is inputted, 2 is temporarily stored in the X register 23a (steps S01 and S02). At this time, since the flag F0 is equal to 1 and the flag F1 is equal to 1, the content of the X register 23a is transferred to the numerator register 23d (steps S03, 08 and 13). Under this state, the display content is shown in FIG. 5D. With the above-described key operations, the mixed fraction data has been entered in the compact electronic calculator.

When the calculation key 15 is operated after the mixed fraction data has been entered, the calculation process in accordance with the operation key is executed (steps S14 and S15).

On the other hand, when the normal fraction data such as $\frac{2}{3}$ is entered, such a key operation is carried out in the order of "3", "c/b" and "2".

When the key is operated to enter "3", "3" is entered into the X register 23a, so that the normal display state is made (steps S01 to S05).

Next, when the "c/b" key 18 is manipulated, the content of the X register 23A is transferred to the denominator register 23d (steps S10, S11, S16 and S12). Subsequently, when "2" is entered by operating the corresponding key, "2" is temporarily stored in the X register 23a. Thereafter, the "2" is inputted into the numerator register 23c (steps S01, S02, S03, S04, S17), whereby the entry of the normal fraction data is accomplished.

ELECTRODE SELECTING CONDITION

Figure 6:
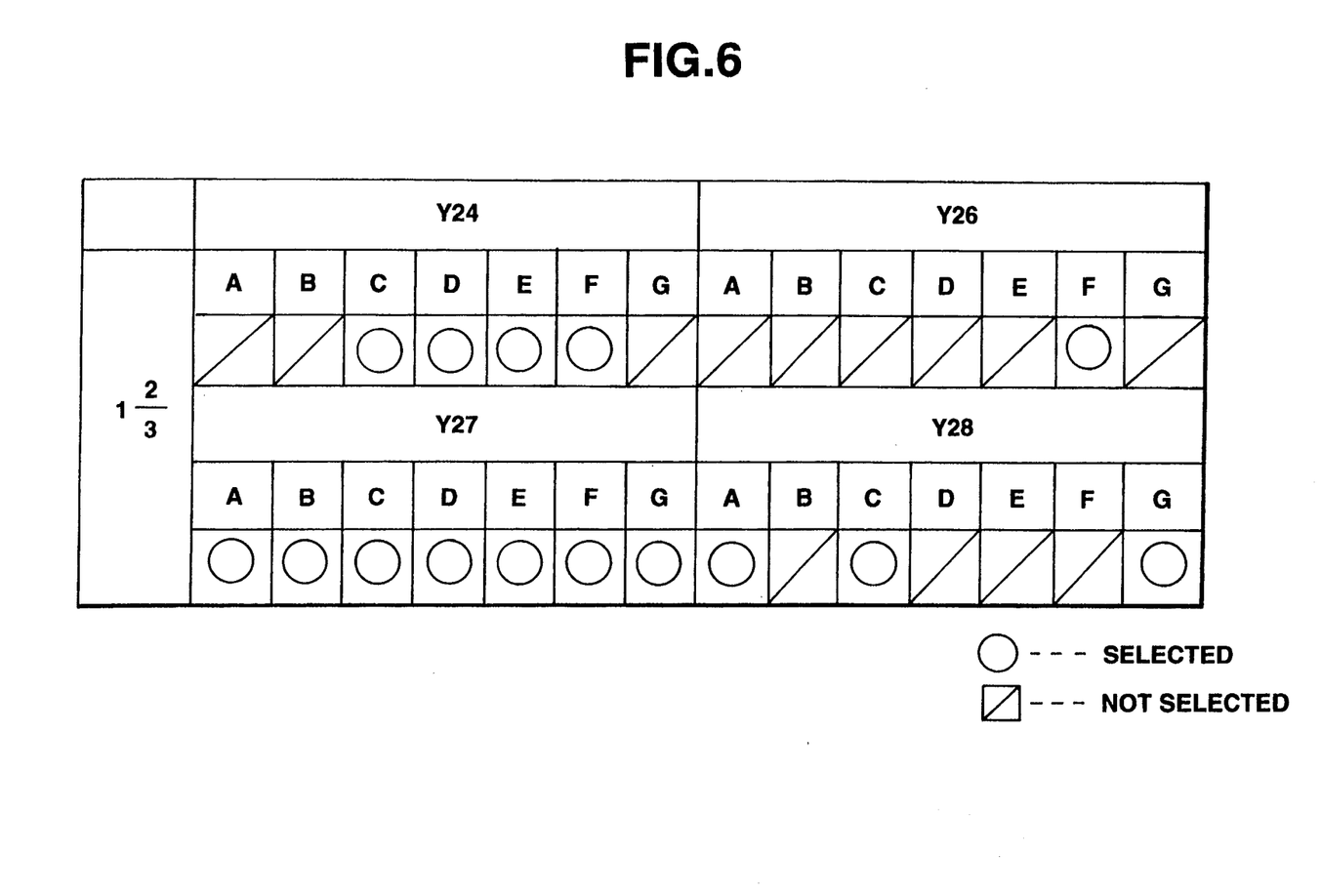
FIG. 6 illustratively indicates an electrode selecting condition for displaying a fraction formula "1 and ⅔" on the display unit of the compact electronic calculator.

In FIG. 6, there is shown such an electrode selecting condition when the mixed fraction data of "$1\frac{2}{3}$ (one and two-third)" is displayed on the display unit 13 of the compact electronic calculator shown in FIG. 1. When the scanning electrodes C, D, E and F would be selected with respect to the data electrode Y24, the integer portion "1" of this mixed fraction data could be displayed by energizing a portion of the upper-staged and lower-staged 8-shaped segment at the second digit and the connection segments 28a, 28b. When the scanning electrode "F" would be selected with respect to the data electrode Y26, the scanning electrodes "A to G" with respect to the data electrode Y27, and the scanning electrodes "A, C, G" with respect to the data electrode Y28, a fraction portion of this mixed fraction data could be displayed at the unit digit place. The numerator "2" is displaced by the upper-staged 8-shaped segments, the denominator "3" is displayed by the lower-staged 8-shaped segments and the fraction symbol is displayed by the bar segment 26, whereby the mixed fraction data of "$1\frac{2}{3}$" (one and two-third) can be displayed in the normal mathmatical expression form.

Figure 5E:
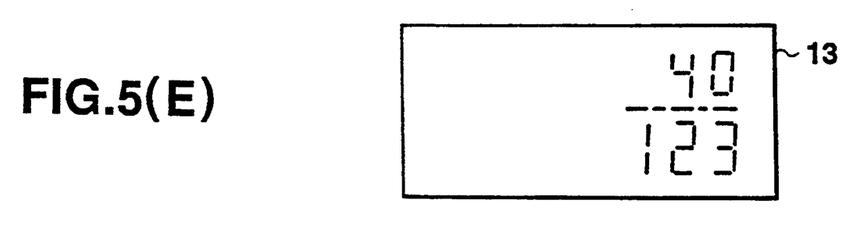

It should be understood that when a numerator value and a denominator value of a fraction are plural digits, respectively, for instance, 40/123, the auxiliary segment 26 provided between the digits is turned On in order to clearly display the bar of this fraction as shown in FIG. 5E.

As previously described in detail, in accordance with the compact electronic calculator with the above-described arrangements, since the lower four digits of the display unit 13 are constructed under such a condition that the three 8-shaped segments 19 are connected to each other along the vertical direction, the fraction formula can be displayed in the normal mathematical expression form. Moreover, the entire display digit of this display unit can be effectively utilized by employing the above-described fraction data display method, as compared with the conventional display apparatus in which the fraction formula is displayed in one line form.

MODIFICATION

Figure 7:
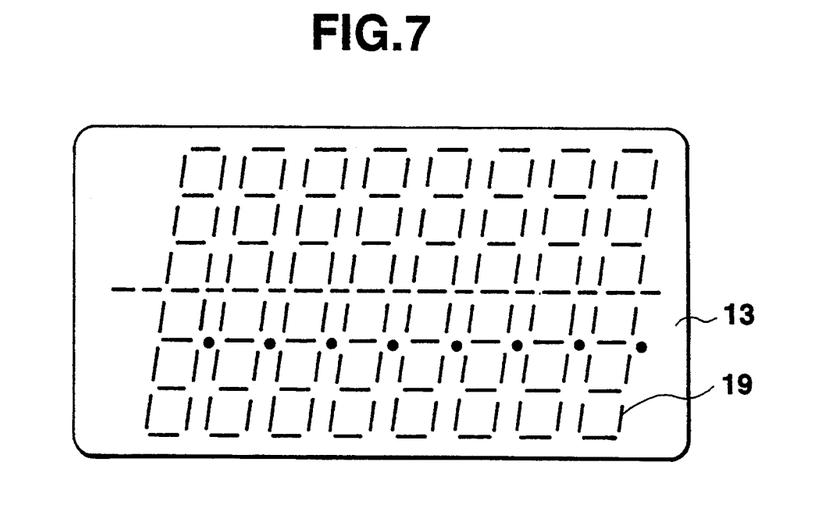
FIG. 7 schematically shows a structure of a display unit according to another embodiment of the present invention.

As apparent from the foregoing descriptions, the present invention is not limited to the above-described embodiments, but may be changed, modified, and substituted without departing from the technical scope and spirit of the present invention. For instance, although the lengths of the auxiliary segments 28a and 28b are shorter than that of the 8-shaped segment, they may be made longer, as illustrated in FIG. 7. Also, only the lower 4 digits of the display unit 13 are so arranged that the fraction formula can be displayed in the normal mathematic expression form in the previous embodiments. Alternatively, as represented in FIG. 7, three set of 8-shaped segments may be mutually coupled to each other along the vertical direction over all 8 digits of the display unit 13, so that a fraction formula may be displayed over the entire display region of the display unit in the normal mathematic expression form.

In this alternative display unit of FIG. 7, an integer portion may be displayed only by the intermediate 8-shaped display members.

What is claimed is:

1. A display apparatus comprising:
    a plurality of paired 8-shaped display members, each 8-shaped display member comprising an upper, a middle and a lower segment all disposed in horizontal directions, and 4 segments all disposed in vertical directions, one of said paired 8-shaped display members being disposed at an upper row of a display and another of said paired 8-shaped display members being disposed at a lower row of the display;
    horizontal bar display segments each disposed between said 8-shaped display members disposed at the upper and lower rows, said horizontal bar display segments being spaced apart in a horizontal direction and each having a horizontal length which is substantially the same as a horizontal length of said upper, middle and lower segments;
    first auxiliary display segments disposed between said 8-shaped display members and said horizontal bar display segments;
    second auxiliary display segments disposed so as to connect said spaced apart horizontal bar display segments;
    driving means electrically connected to said paired 8-shaped display members, to said horizontal bar display segments, to said first auxiliary display segments and to said second auxiliary display segments, for driving the segments to display data;
    first controlling means for controlling said driving means to drive segments of said paired 8-shaped display members disposed at the upper and lower rows, to drive said horizontal bar display segment disposed between the driven 8-shaped bar display segments, and to drive said first auxiliary display segments disposed between the driven 8-shaped bar display segments, so as to display numerical data centered on said horizontal bar display segment, when numerical data is to be displayed;
    second controlling means for controlling said driving means to drive segments of said 8-shaped display member disposed at the upper row so as to display a numerator of fraction data, and to drive segments of said 8-shaped display members disposed at the lower row so as to display a denominator of the fraction data; and third controlling means for controlling said driving means to drive said horizontal bar display segments corresponding to digits of the displayed fraction data and said second auxiliary display segments between the driven horizontal bar display segments so as to display a bar symbol of the fraction data, when fraction data is to be displayed.

2. A display apparatus as claimed in claim 1, further comprising:

key input means having number entry keys and a fraction designation key, for inputting fraction data; and fraction storage means for storing the fraction data inputted by said key input means.

* * * * *